(12) United States Patent
Utz et al.

(10) Patent No.: US 6,604,692 B2
(45) Date of Patent: Aug. 12, 2003

(54) HEATABLE WINDSHIELD WASHER NOZZLE

(75) Inventors: Daniel Utz, Bad Bellingen (DE); Hans-Jurgen Lesser, Rheinfelden (DE)

(73) Assignee: A. Raymond & Cie. (FR)

( * ) Notice: Subject to any disclaimer, the term of this patent is extended or adjusted under 35 U.S.C. 154(b) by 146 days.

(21) Appl. No.: 09/894,490

(22) Filed: Jun. 28, 2001

(65) Prior Publication Data

US 2002/0000481 A1 Jan. 3, 2002

(30) Foreign Application Priority Data

Jun. 30, 2000 (DE) .......................................... 100 31 088

(51) Int. Cl.$^7$ ................ B05B 1/10; B60S 1/46
(52) U.S. Cl. .................... 239/284.1; 239/284.2
(58) Field of Search ................ 239/128, 135, 239/284.1, 284.2, 133, 130, 134, 139; 15/250.04, 250.35, 250.34, 250.01, 250.02, 250.03

(56) References Cited

FOREIGN PATENT DOCUMENTS

DE       19833142 A1      1/2000   ............ B60S/1/52

*Primary Examiner*—Davis Hwu
(74) *Attorney, Agent, or Firm*—Gifford, Krass, Groh, Sprinkle, Anderson & Citkowski, P.C.

(57) ABSTRACT

A heatable windshield washer nozzle is designed for mounting on the windshield wiper of a motor vehicle. The washer nozzle has a housing with a connection adapter. This connection adapter connects to a spray water hose that is electrically heatable via cables or woven wires molded into it. The ends of the heating cables are electrically bridged across just before the end of the hose. The housing is further equipped with a chamber for receiving a nozzle body and a heating plate above the nozzle body. A cover closes the chamber. The nozzle body is a flat chip with several channels fanning outward from a central water input opening. A bar is formed on the rim of the heating plate, which completely covers the surface of the nozzle chip. This bar extends along the connection adapter, so that when the heated spray water hose is slipped onto the connection adapter, the ends 23 of the heating cables extend over the bar of the heating plate without making direct contact. The heat generated by the heating cables is transferred to the heating plate without direct contact with the bar of the heating plate, and the heating plate can transfer its heat directly to the spray water so that it is heated even to the very end of the channels.

9 Claims, 2 Drawing Sheets

HEATABLE WINDSHIELD WASHER NOZZLE

FIELD OF THE INVENTION

The present invention relates generally to a heatable windshield washer nozzle for mounting on the windshield wiper of a motor vehicle.

BACKGROUND OF THE INVENTION

A heated windshield washer nozzle is shown in German Patent No. DE 198 33 142 A1. In the German reference the nozzle housing is fastened onto the wiper arm by means of a clamp device and has a connection adapter for a heatable spray water hose. Heating cables are embedded, i.e., molded, in the hose material along the water line. A heating element is located in a separate chamber above the spray nozzles and is connected by a direct plug connection to the ends of the heating cables projecting out of the hose. Then a raised flap over the heating element is lowered and engaged with the edge of the housing.

The aim of the German washer nozzle arrangement is to position the heating element as close as possible to the washer nozzles in order to achieve the best possible heating of the spray fluid all the way into the washer nozzle. Preferably, this keeps the spray water in the liquid state even when the exterior temperature is below the freezing point. However, because the heating element is connected to the heating cables by means of a plug contact, the channel with the nozzles carrying the spray water is separated from the heating element by an intervening wall. Therefore the heat of the heating element is transferred to the spray water only partially, i.e., incompletely. Establishment of the electrical connection via the plug contact is also rather complicated. The two heating cables must first be exposed at the end of the hose and then soldered to a plug.

SUMMARY OF THE INVENTION

The objective of the present invention is to simplify the heat transfer from the heating wires to the heating element and at the same time to improve the transfer of the heat to the spray water in the nozzle. This objective is realized according to the present invention by locating a heating plate directly above the body of the nozzle, such that the heating plate completely covers the surface of the chip. The heating plate has a bar formed on its edge which projects into the water hose connection adapter. When the heatable spray water hose is slipped onto the connection adapter, the electrically bridged ends of the heating cables extend over the bar of the heating plate without making direct contact with it.

The design of the present invention allows the heat produced by the heating cables to be transferred to the heating plate without direct contact between the cables and the bar, and for the heating plate to transfer its heat directly to the spray water even to the very end of the channels, so that an optimal heating of the spray water is ensured.

These and additional characteristics of the present invention are explained in greater detail with reference to a preferred embodiment illustrated in the appended drawings.

DETAILED DESCRIPTION OF THE PREFERRED EMBODIMENT

Figure 1:
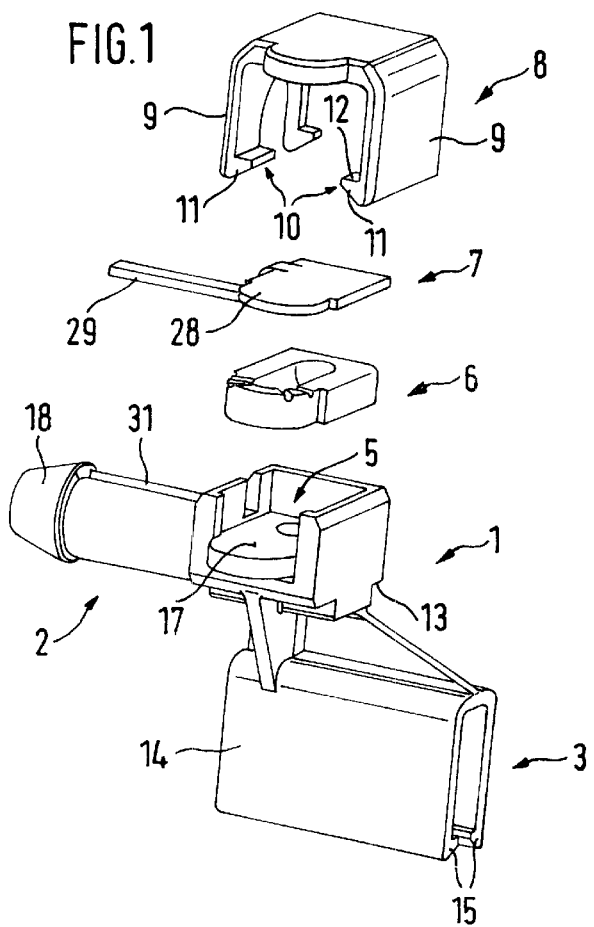
FIG. 1 is an "exploded" oblique view of a preferred embodiment of a heatable washer nozzle according to the present invention.
Figure 2:
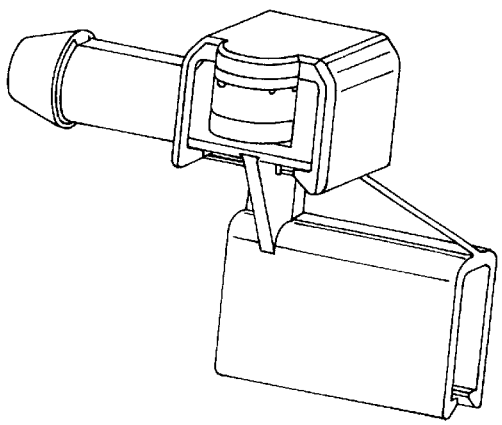
FIG. 2 is an oblique view of the washer nozzle of FIG. 1 after being assembled.
Figure 3:
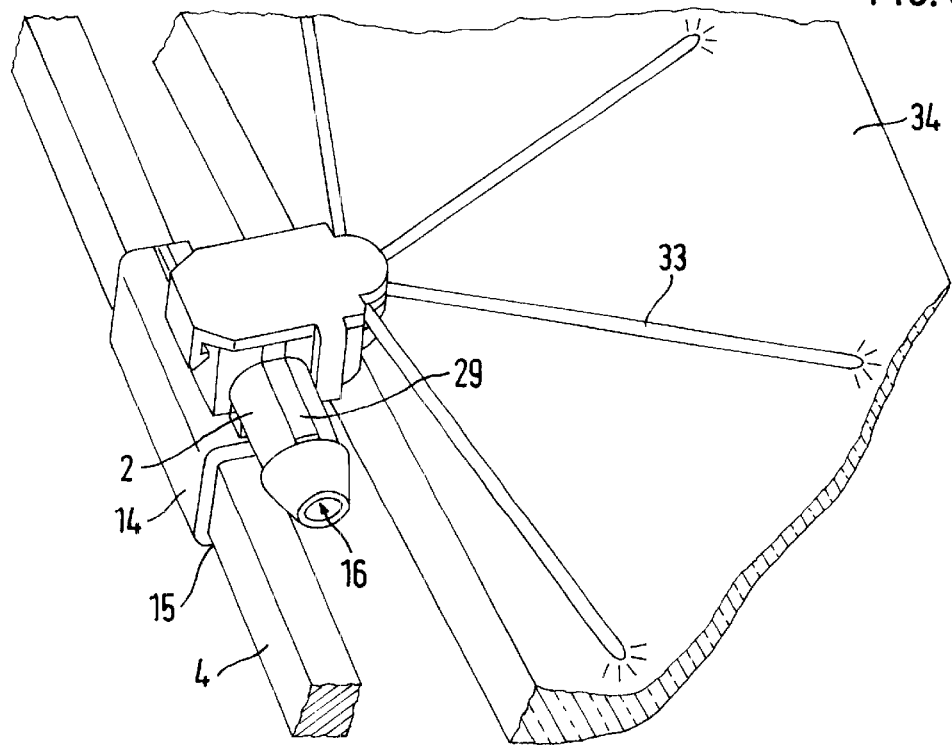
FIG. 3 is a perspective view of the washer nozzle of FIGS. 1 and 2 mounted on a wiper arm and spraying a windshield.
Figure 4:
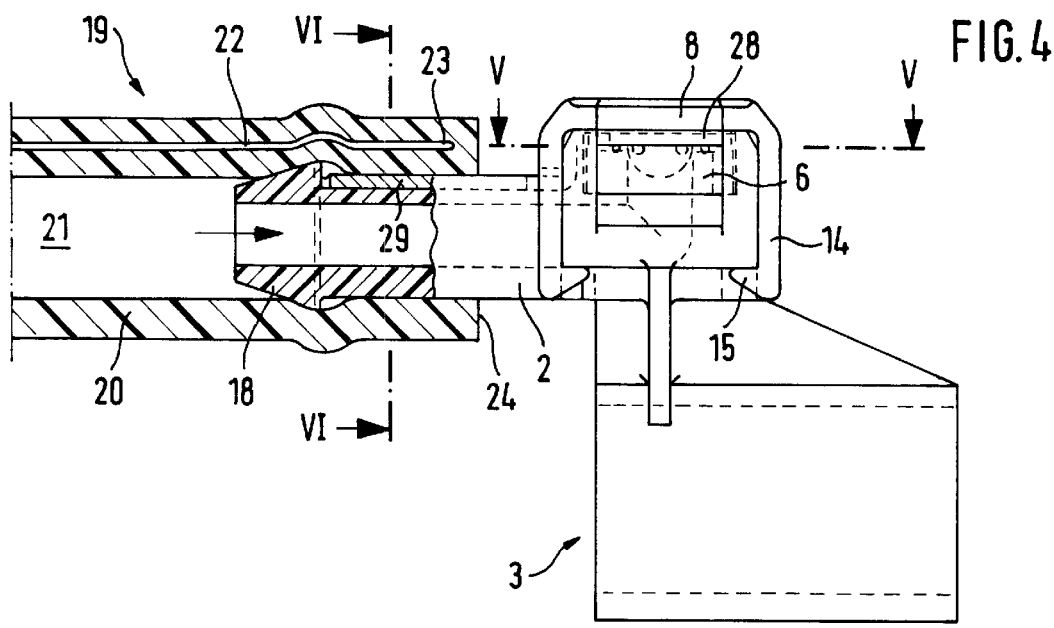
FIG. 4 is a side view of the assembled washer nozzle with a section through the water hose fitted onto the connection adapter.
Figure 5:
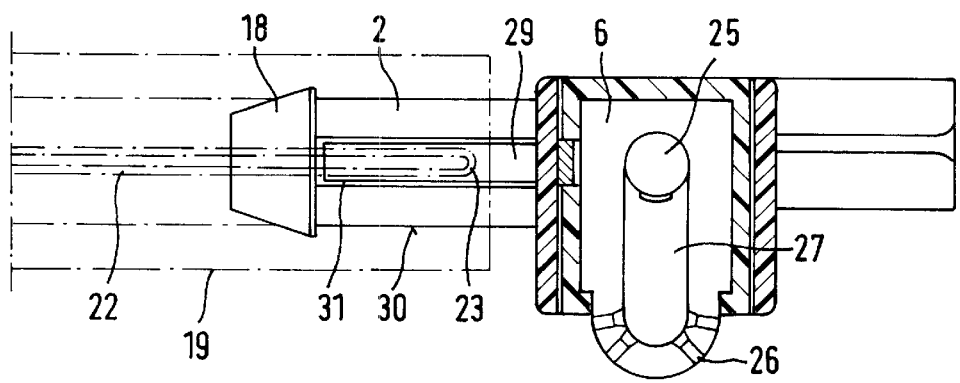
FIG. 5 is a top view of the assembled washer nozzle with a section through the washer nozzle housing taken along line V—V in FIG. 4.
Figure 6:
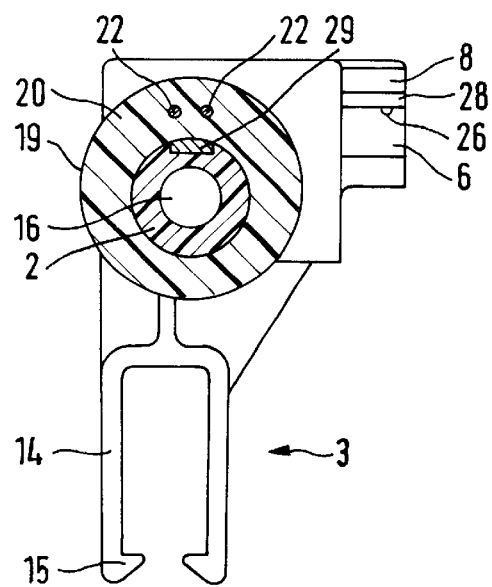
FIG. 6 is a front view of the assembled washer nozzle with a section through the connection adapter taken along line VI—VI in FIG. 4.

Referring to FIGS. 1–6, a windshield washer nozzle according to the present invention has a housing 1 with a water hose connection adapter 2 formed on the side, and a clamping device 3 for mounting the housing 1 on the wiper arm 4 of a windshield wiper for motor vehicles. The housing 1 has an open-topped chamber 5 for holding a nozzle body 6 and a heating plate 7. The chamber 5 is closed by a cover 8, which is formed with two opposing, molded on lateral side walls 9. Engagement edges 11 are provided on the free end of the elastically expandable side walls 9. The edges have opposed inwardly extending tips 10. When the cover 8 is pressed onto the housing 1, the engagement edges engage with engagement surfaces 12, which project approximately at right angles behind the lower housing edge 13, and thus keep the chamber 5 closed (see FIG. 2).

The clamping device 3 formed on the housing 1 has two expandable clamping arms 14 with opposing engagement edges 15 formed on their free ends. These clamping arms 14 are separated from each other and are positioned such that once the clamping arms 14 have been mounted on the wiper arm 4, the water hose connection adapter 2 is oriented approximately parallel to the wiper arm 4 and is secured in the axial direction by suitable fixation means.

The water hose connection adapter 2 provides the input of spray water into the chamber 5 of the nozzle housing 1. The connection adapter 2 has a central throughput bore 16, which empties out at the base 17 of the chamber 5. The adapter 2 is generally cylindrical and has on its free end a conically divergent insertion wall 18 over which an elastically expandable water hose 19 is slipped. Electrically heatable cables 22 are formed along the water conduit 21 in the hose casing 20 of the water hose 19. The ends 23 of the cables 22 are bridged across shortly before the end 24 of the hose (see FIGS. 4 and 5). Electrical wire mesh, which also heats the hose 19 over its entire length, can be molded into the spray water hose 19 instead of heating cables 22.

The nozzle body 6 is preferably designed as a flat chip, and is provided with a central spray water input opening 25 that aligns with the throughput bore 16 of the connection adapter 2. The nozzle body preferably has a semicircular front side that projects out of the chamber 5. Several spray water channels 26 fan outwardly to the semicircular front side of the nozzle body chip 5 from a wider central duct, which is connected with the central spray water input opening 25 (see FIG. 5). The spray water leaves the nozzle body 6 through these channels 26 and sprays the glass windshield 34 with so-called micro-streams 33 (see FIG. 3).

After assembly, the upper side of the nozzle body 6 is completely covered by the heating plate 28, and is thereby sealed off so as to be watertight. A narrow bar 29 is formed on the rim of the heating plate 28 and extends therefrom. Once assembled, the bar 29 extends along the connection adapter 2. A groove 31 is preferably provided in the outer casing 30 of the connection adapter 2 to receive the bar 29. The bar 29 is preferably shaped such that the surface of the bar 29 forms a positive seal with the outer casing 30 (see FIG. 6).

When the spray water hose 19 is attached, the end 24 is slipped onto the connection adapter 2 in such a way that the two connected ends 23 of the heating cables 22 run parallel to the bar 29 of the heating plate 28 without actually making contact. The heat generated by the heating cables 22 then not only prevents the spray water from freezing over the entire length of the hose 19, but also is sufficient to transfer enough heat via the bar 29 to the heating plate 28, so that the spray water is protected against freezing to the very end of the channels 26.

What is claimed is:

1. A heatable windshield washer nozzle for mounting on a windshield wiper arm of a motor vehicle, the nozzle having a housing with a connection adapter for receiving a spray water hose that is heatable via electrically conductive cables or wire mesh and a clamping device for mounting the housing on the wiper arm, the nozzle further having a chamber for holding a nozzle body and a heating element positionable above the nozzle body, the heating element being heatable via the cables or mesh of the spray water conduit, the nozzle further having a cover for closing the chamber, the nozzle body being a flat chip with several channels fanning out from a central water input opening communicating with the connection adapter, characterized in that:

a heating plate is positioned directly above the nozzle body and completely covers the surface of the chip, the heating plate having a bar which projects into the connection adapter such that when the heatable spray water hose is slipped onto the connection adapter, the heating cables extend over the bar of the heating plate without making direct contact.

2. The heatable windshield washer nozzle according to claim 1, wherein the connection adapter has an outer casing with a groove formed therein, the bar being embedded in the groove formed in the outer casing of the connection adapter.

3. The heatable windshield washer nozzle according to claim 2, wherein the bar forms a positive seal with the outer casing.

4. The heatable windshield washer nozzle according to claim 1, wherein the channels in the nozzle body are open at the top and are sealed by the heating plate so as to be watertight.

5. A heatable windshield washer nozzle for supplying a spray of liquid onto a windshield of a motor vehicle, the nozzle comprising:

a housing having a connection adapter for receiving a spray liquid hose of the type having a side wall with a heating member therein, the housing further having a chamber defined therein, the chamber having an inlet in fluid communication with the connection adapter;

a nozzle body received in the chamber, the body having a liquid input opening in fluid communication with the inlet of the chamber and a channel for directing a spray onto the windshield, the channel in fluid communication with the liquid input opening; and a heating plate in thermal contact with the nozzle body, the heating plate having a bar portion extending along an exterior surface of the connection adapter such that when the spray liquid hose is received onto the connection adapter, the hose extends over the bar portion to be in thermal communication with the bar portion.

6. The heatable windshield washer nozzle according to claim 5, wherein the nozzle body includes multiple channels that are open at the top, the heating plate being positioned on top of the nozzle body such that the plate closes the open tops of the channels.

7. The heatable windshield washer nozzle according to claim 5, wherein the housing further comprises a clamping device for mounting the housing on a windshield washer arm.

8. The heatable windshield washer nozzle according to claim 5, wherein the connection adapter has an outer casing with a groove formed therein, the bar portion being embedded in the groove formed in the outer casing of the connection adapter.

9. The heatable windshield washer nozzle according to claim 8, wherein the bar forms a positive seal with the outer casing.

* * * * *